Feb. 6, 1962  W. G. SMITH  3,019,475
STRETCHING APPARATUS
Filed March 8, 1960  2 Sheets-Sheet 1
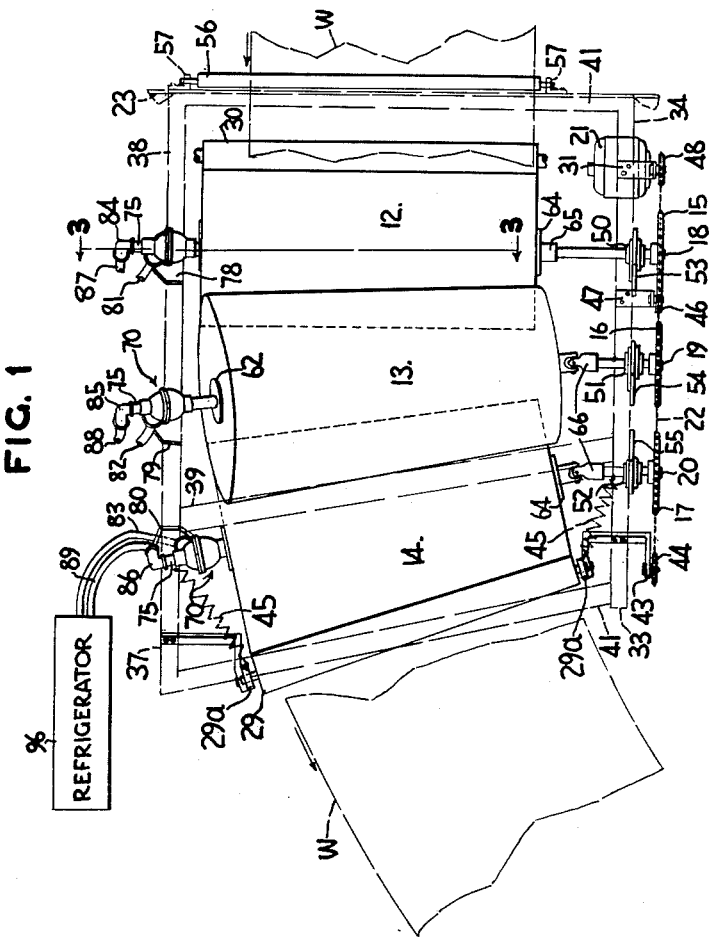
INVENTOR.
WILLIAM G. SMITH
BY
Oscar L. Spencer
ATTORNEY Feb. 6, 1962 W. G. SMITH 3,019,475
STRETCHING APPARATUS
Filed March 8, 1960 2 Sheets-Sheet 2
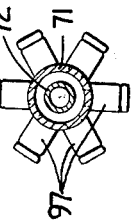
FIG. 4
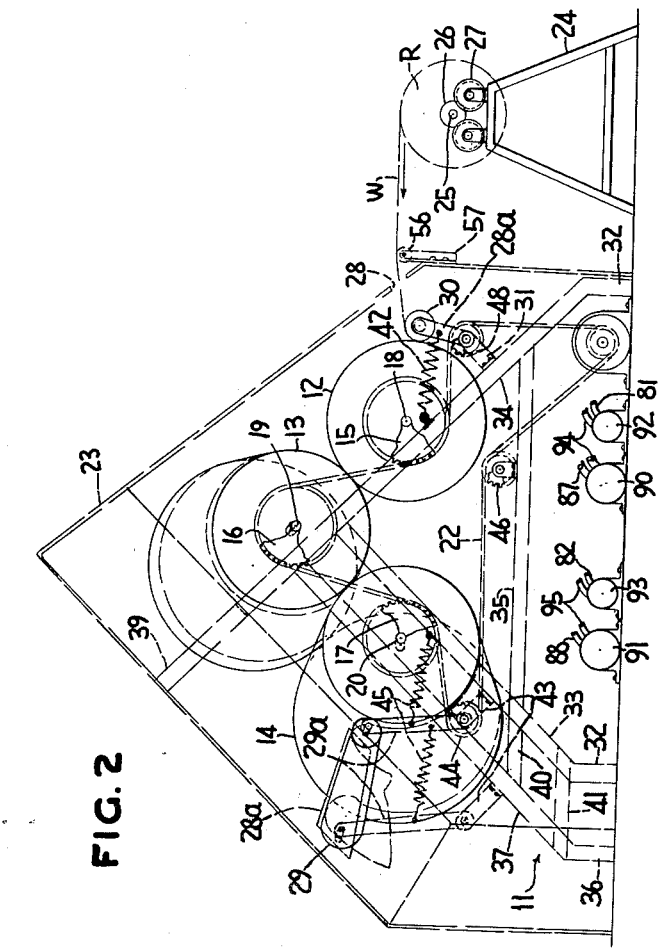
INVENTOR.
WILLIAM G. SMITH
BY
Oscar L. Spencer
ATTORNEY United States Patent Office 3,019,475
Patented Feb. 6, 1962

3,019,475
STRETCHING APPARATUS
William G. Smith, Sarver, Pa., assignor to Pittsburgh Plate Glass Company, a corporation of Pennsylvania
Filed Mar. 8, 1960, Ser. No. 13,526
18 Claims. (Cl. 18—1)

This invention relates to a stretching apparatus and more specifically relates to an apparatus for a continuous stretching of a web or sheeting of a plastic material, such as a plasticized polyvinyl acetal or other thermoplastic material.

In the manufacture of laminated safety glass for one-piece windshields of modern automobiles a thermoplastic sheet is placed between two curved glass sheets. By the application of heat and pressure the plastic sheet is bonded to the glass sheets. These windshields have various types of curvature. They are curved longitudinally and may be curved vertically. The windshields may be flopped or tilted back from the vertical when installed in the automobile. These laminated windshields can have an upper colored portion to reduce glare. This coloration in the thermoplastic sheet as a colored band which is preferably graduated with the intensity of coloration decreases from the top of the windshield so that the cut-off line between the colored band and the uncolored portion of the plastic is above the direct line of vision.

The thermoplastic sheets for these curved windshields are made as a web or sheeting that has a graduated colored band at or adjacent one of the longitudinal edges of the web. This sheeting is cut into sheets which are placed between the curved glass sheets, before or after cutting each of the sheets to pattern.

When using a thermoplastic sheet having a rectilinear colored band to make a curved windshield, the cut-off line appears to droop at the ends. As pointed out by U.S. patents which relate to the stretching of plastic sheets having rectilinear colored bands, it is desirable to place between the curved glass sheets a thermoplastic sheet which has a graduated colored band that has a curved cut-off line. The final product when installed as a windshield in a car appears to have a horizontal cut-off line between the colored and uncolored portions of the plastic entirely across the windshield.

A method and apparatus is disclosed and claimed in U.S. Patent No. 2,700,007 for shaping a thermoplastic interlayer sheet to be used in a curved laminated windshield. Thermoplastic sheets having rectilinear colored bands along one major margin are stretched differentially to provide the desired curvature of the cut-off line between the colored portion and the uncolored portion of the sheet. A stretching frame is used. A number of sheets is clamped in the apparatus and its clamping arms are pivoted to provide the differential stretching. Other patents similarly stretch plastic sheets. It is necessary to cut a web of thermoplastic material into a number of sheets before the stretching can be accomplished by the methods and apparatuses of the prior art. This technique requires a considerable amount of manual labor and thus results in the production of a relatively small number of sheets of stretched plastic per man-hour.

It is an object of the present invention to provide an apparatus that continuously stretches a web of plastic material having a longitudinal rectilinear colored band while moving the web through a stretching zone to produce a web which has a continuously curved cut-off line between the colored band and the uncolored portion of the web.

It is another object of this invention to provide an apparatus for converting a web of plastic having straight edges and a rectilinear graduated colored band at one margin to a plastic having edges with curvature so that the cut-off line of the colored band toward the other margin has a radius of curvature.

These and other objects of the present invention will be apparent to one skilled in the art from the description of the preferred embodiment of the apparatus which follows when taken in conjunction with the drawings in which:

FIG. 1 is a plan of the apparatus;
FIG. 2 is an elevation of the apparatus;
FIG. 3 is a cross section taken along the line 3—3 of FIG. 1 and showing some parts in elevation; and
FIG. 4 is a cross section taken along the line 4—4 of FIG. 3.

The apparatus has a supporting structure generally indicated at 11, a straight or cylindrical roll 12, tapered or conical rolls 13 and 14, sprockets 15, 16 and 17 keyed on shafts 18, 19 and 20 connected to rolls 12, 13 and 14, a motor 21 which drives a chain 22 engaging sprockets 15, 16, and 17, and a hood or covering 23 shown in phantom. The rolls 12 and 13 are heated and roll 14 is cooled. The axes of rolls 12, 13 and 14 are disposed relative to one another in a specific manner so that there is no slippage or movement of a web W of thermoplastic material that is fed partially around these rolls. The relative disposition of these axes is such that the stretching of web W occurs when it passes from roll 12 to roll 13, i.e., in the area between the opposing tangential planes of cylindrical roll 12 and conical roll 13.

Of course, each of conical rolls 13 and 14 has a circular end that is larger in diameter than the other circular end. The rolls 13 and 14 have surfaces that constitute the frustum of a cone and thus rolls 13 and 14 may be called frustoconical rolls.

The thermoplastic material that is used in sheet form as the interlayer for a laminated safety windshield is conventionally a plasticized polyvinyl butyral which is an illustrative type of plasticized polyvinyl acetal. The apparatus is described below for purpose of illustration in connection with the stretching of plasticized polyvinyl butyral.

The web of this material is commercially available in a length of 750 feet and a width of about 36 inches. It is in roll form. The length of the sheets to be cut from web W depends upon the ultimate product. A windshield for a specific modern car requires an interlayer sheet that is 86 inches long. The interlayer may be cut to a rectangular shape and then cut to the required outline or pattern. The conventional thickness of the interlayer sheets is about 0.015 inch. The apparatus is not limited to the stretching of a web of plastic material of this thickness. The length of rolls 12, 13 and 14 is somewhat greater than this width of web W, e.g., when using a 36-inch wide web W the length of rolls 12, 13 and 14 is 42 inches.

A roll R of web W of plasticized polyvinyl butyral is mounted on a supporting stand 24 for rotation about the axis of a shaft 25 about which web W is rolled. Discs 26 on the ends of shaft 25 are rotatably supported in grooves of pairs of guide rolls 27 which are rotatably mounted on stand 24. The web W is fed from roll R through a slot 28 in hood 23 and after stretching and cooling passes through a slot or opening 28a in hood 23.

The web W after passing through slot 28 passes over cylindrical roll 30 rotatably mounted on arms 30a pivotally mounted on brackets 31 mounted on supporting structure 11. The web W passes around and in contact with cylindrical roll 12 and then around and in contact with conical roll 13. The web W passes around and in contact with conical roll 14 and then over a tapered or conical roll 29 and through opening 28a. The roll 29 is rotatably mounted by bearings (not shown) on arms 29a. The web W is fed to a cutting station, e.g., to a table where it is cut across the web from one arcuate edge to the other preferably in a radial direction.

The supporting structure 11 is a frame which is basically a number of angle irons shown in phantom in FIG. 2. In front of rolls 12, 13 and 14 are short vertical angle irons 32. Inclined angle irons 33 and 34 are connected to angle irons 32 and to each other. The angle iron 34 extends upwardly beyond angle iron 33. The angle irons 33 and 34 support a horizontal angle iron 35. The supporting structure 11 has short vertical angle irons 36 behind rolls 12, 13 and 14 and inclined angle irons 37 and 38 are connected to angle iron 36 and to each other. The angle iron 38 extends upwardly beyond angle iron 37. The angle irons 34 and 38 are connected at their top ends by an angle iron 39. The angle irons 37 and 38 support a horizontal angle iron 40. The angle irons 33 and 37 and angle irons 34 and 38 support horizontal angle irons 41.

As seen in FIG. 1, brackets 43 mounted on angle irons 33 and 37 pivotally mount arms 29a. Springs 45 are connected to arms 29a and to angle irons 33 and 37 to bias roll 29 against roll 14 whereby roll 29 serves as a tension take-off roll. Springs 42 are connected to arms 30a and angle irons 34 and 38 to bias roll 30 against roll 12 whereby roll 30 serves as a feed-in tension roll. The bracket 43 mounted on angle iron 33 rotatably supports an idler sprocket 44. An idler sprocket 46 is rotatably supported by a bracket 47 mounted on angle iron 35. The brackets 31 are mounted on angle irons 34 and 39. The bracket 31 mounted on angle iron 34 rotatably supports an idler sprocket 48. The idler sprockets 44, 46 and 48 are engaged by chain 22.

As seen in FIG. 1, the shaft 18, 19 and 20 are mounted on bearings 50, 51 and 52 supported by brackets 53, 54 and 55, respectively. The brackets 53 and 54 are mounted on the angle iron 34. The bracket 55 is mounted on angle iron 33. A wood cylindrical roll 56 is rotatably mounted on brackets 57 mounted on hood 23.

The rolls 12, 13 and 14 are hollow with end plates 60. Of course, end plates 60 of roll 12 have the same diameter whereas one of end plates 60 of each of rolls 13 and 14 has the same diameter as end plates 60 of roll 12 and the diameter of the other end plate 60 of rolls 13 and 14 is larger. All end plates 60 of rolls 12, 13 and 14 have central openings.

Three hollow shafts 61 extend through the central openings of rear plates 60. Each shaft 61 is externally threaded at both ends. Each shaft 61 has an intermediate circular flange 62 with a circular shoulder 63 which abuts plate 60. The flanges 62 are bolted to plates 60 in fluid-tight relationship. The front plates 60 have circular plates 64 with circular shoulders which abut plates 60 within their central openings. The plates 64 are bolted to end plates 60 in fluid-tight relationship. One of plates 64 has an integral stub shaft 65 which has a central opening. One end of shaft 18 is in the central opening of stub shaft 65 and connected to it by set screws (not shown). Each of the other circular plates 64 has a stub shaft which extends into and is connected to one end of a universal joint 66. One of universal joints 66 is connected to shaft 19. The other universal joint 66 is connected to shaft 20.

The threaded end of each of hollow shafts 61 extends into and is connected to a rotating joint generally indicated at 70. The other end of each shaft 61 has mounted on it a tube 71. A tube 72 is threaded at one end for connection to rotating joint 70. The tube 72 is concentric with and extends through tube 71. The other end of tube 71 has a flange directed toward tube 72 and a packing material 73 is between tube 72 and this flanged end of tube 71. This provides a chamber between tubes 71 and 72 which is closed at the end by packing 73. The chamber extends in the other direction into rotating joint 70 where it communicates with an inlet 74 of rotating joint 70. The end of tube 72 in rotating joint 70 is adjacent a tube 75 which is threaded into rotating joint 70 so that fluid in tube 72 can flow to tube 75. The other end of each tube 72 has an elbow 76 which threadedly supports a tube 77 that extends downwardly toward the bottom of the chamber within roll 12, 13 or 14. With this construction tube 71 in rolls 12, 13 and 14 are rotated with rotation of these rolls but none of tubes 72 rotates. Thus tubes 77 remain downwardly extending during rotation of rolls 12, 13 and 14. The rotating joints 70, which are connected to rolls 12 and 13, are mounted on brackets 78 and 79, respectively, mounted on angle iron 38. The rotating joint 70 connected to roll 14 is mounted on a bracket 80 mounted on angle iron 37. Pipes 81, 82 and 83 are connected to rotating joints 70 which are connected to rolls 12, 13 and 14, respectively. Each of pipes 81, 82 and 83 is connected to one of rotating joints 70 so that it communicates with inlet 74.

The pipes 75, which are connected by rotating joints to the chambers of rolls 12, 13 and 14 are connected by elbows 84, 85 and 86, respectively. Pipes 87, 88 and 89 are connected to elbows 84, 85 and 86, respectively.

The rotating joints 70 may be of any conventional construction. The rotating joint 70 shown in the drawings is a Chiksan high temperature rotating joint No. HT-1530–R which is shown on page 20 of the Chiksan catalog No. G–4R, copyrighted in 1957 by Chiksan Company, Brea, California. This joint has a ball bearing between the parts that have relative rotary motion. It has a sealed assembly with a grease fitting for lubrication of the ball bearing.

Instead of using a rotating joint with concentric tubes 71 and 72, the fluid can be introduced into and withdrawn from the rotating drums by other constructions. For example, a pair of tubes, similar to tubes 71 and 72, can be supported in side-by-side relationship within a third tube mounted by roller bearings in shaft 61. Oil seals between shaft 61 and the third tube prevent fluid leakage. In this construction the tube similar to tube 71 would not rotate. Thus fewer nozzles 97 for each set would be required to spray the upper part of rolls 12, 13 and 14.

The apparatus has fluid pumps 90 and 91 which are operated by motors (not shown), and heat exchangers 92 and 93. The pipe 87 is connected to the inlet end of pump 90. A pipe 94 connects the outlet of pump 90 to the inlet of heat exchanger 92. The pipe 81 is connected to the outlet of heat exchanger 92. The pipe 88 is connected to the inlet of pump 91. A pipe 95 connects the outlet of pump 91 to the inlet of heat exchanger 93. The pipe 82 is connected to the outlet of heat exchanger 93. The exchangers 92 and 93 are heated by electrical resistance units (not shown) which are controlled by thermostats (not shown) that sense the temperature of fluid leaving heat exchangers 92 and 93.

The pipe 89 is connected to the inlet of a pump (not shown) of a unitary refrigerator 96 which also includes a heat exchanger (not shown). The outlet of the pump is connected to the inlet of the cooling system or heat exchanger of refrigerator 96. The outlet of the cooling system is connected to pipe 83.

Each of pipes 71 has mounted on it longitudinally spaced sets of spray nozzles 97. The spray nozzles 97 of each set are radially disposed around tube 71. The fluid introduced into inlet 74 of one of universal joints 70 passes to the annulus between pipes 71 and 72 and then radially into one of rolls 12, 13 or 14 by spray nozzles 97. A quantity of the liquid is in the bottom portion of rolls 12, 13 and 14. The fluid, which may be oil for heating rolls 12 and 13 and water for cooling roll 14, is continuously pumped from each roll through pipes 77 and 72, through rotating joint 70, pipe 75 and to pump 90 or 91 or the pump in refrigerator 96. The fluid is pumped to the associated heat exchanger 92 or 93 or the one that is part of refrigerator 96 and thence through either pipe 87, pipe 88 or pipe 89 back through rotating joint 70 and finally through sprays 97 into roll 12, 13 or 14.

The web of polyvinyl acetal is tacky. To prevent bonding of the web to itself, it is coated with sodium bicarbonate before winding it into a roll. The apparatus of the present invention can be used to stretch the thermoplastic web, before or after the sodium bicarbonate is removed by water washing. Because of the tackiness, it is desirable to coat the rolls with a material that prevents adhesion of the web to the metal rolls. A suitable material is silicone resin. A commercial material is made by Dow Corning Corporation sold under the name Dow Corning R-671. This material, which is a thermosetting, semi-permanent release agent, can be applied to the cylindrical or conical surface of rolls 12, 13 or 14 by immersion, spraying or brushing. The coating is air dried until its tackiness disappears. Then the roll is placed in a 425° F. oven for about two hours to cure the resin.

The hood 23 can support a partition to divide the chamber essentially into two compartments. The rolls 12 and 13 would be in one compartment and roll 14 would be in the other compartment. This is preferable because rolls 12 and 13 are heated whereas roll 14 is cooled. In order to provide a proper heating of the web as it passes around roll 12, it is necessary to control the temperature of that roll. Without the cover of hood 23 this control would not be entirely satisfactory. Similarly, it is necessary to control the surface temperature of roll 13.

The rolls R of web W are usually stored in a room of controlled temperature and humidity. The temperature is about 70° F. and the relative humidity is quite low, e.g., about 15 percent or lower. The web of this material is stored under these conditions until it is washed and cut to pattern. Furthermore, the pattern cut sheets are placed between the two glass sheets in the same room or in another room that is similarly controlled as to temperature and relative humidity. The apparatus of this invention should be in this room.

The required temperature of the heated oil or other fluid introduced into rolls 12 and 13 is dependent upon the nature of the web of material to be stretched, upon the rate of travel of the web around these rolls and upon the amount of curvature to be given to the cut-off line. With the embodiment of the apparatus shown in the drawings the heat exchangers 81 and 82 have been controlled so that oil leaving these heaters for passage through rolls 12 and 13 have been in a range of 240 to 270° F. for one commercial plasticized polyvinyl butyral and 270 to 300° F. for a product of this type from another manufacturer. Of course, these temperatures are not the temperatures of the surfaces of rolls 12 and 13. When using aluminum as a metal for these rolls, the stretching operation has been carried out satisfactorily with an indicated surface temperature for the rolls of about 220 to 230° F.

The roll 14 has been kept cool by using refrigerated water at a temperature of about 60° F. When using the apparatus without a partition substantially separating the enclosure under hood 23 into two chambers, it is preferred that the temperature of the liquid in roll 14 be considerably lower. Using ethylene glycol as the coolant, it has been fed to roll 14 after it has been cooled to a temperature below 30° F. in refrigerator 96.

As mentioned above, rolls 12, 13 and 14 are about 42 inches long in the illustrative embodiment for the stretching of a web of polyvinyl butyral having a width of about 36 inches. The cylindrical roll 12 has a diameter of 20¼ inches. This is also the diameter of the smaller end of each of rolls 13 and 14. The diameter of the larger end of each of rolls 13 and 14 is 27 inches. Thus, the conical rolls 13 and 14 in the preferred embodiment have the same included angle.

The rolls 12 and 13 are rotatably mounted so that the angle between the axis of roll 12 and the axis of roll 13 is equal to the included angle of the cone of which conical roll 13 is a frustum. Rolls 12 and 13 are mounted so that the distance between them at the smaller end of roll 13 is not much greater than the thickness of web W. The maximum distance between them at this end is preferably about 0.15 inch. Because rolls 12 and 13 are mounted as specified above, the larger end of roll 13 is a substantially greater distance from the corresponding end of roll 12. In the illustrative embodiment this distance is about 4½ inches.

The roll 14 is rotatably mounted with respect to roll 13 so that at both ends of these rolls the distance between them is not much greater than the thickness of web W. The distance between rolls 13 and 14 at their larger ends is slightly greater than the distance between these rolls at their smaller ends. Because rolls 13 and 14 have the same included angle and have ends with the same diameters, the apex of the cone of which roll 13 is a frustum is at the same point as the apex of the cone of which roll 14 is a frustum. Thus rolls 13 and 14 may be spaced farther apart than stated above so long as the apex of the cone of roll 13 and the apex of the cone of roll 14 are at the same point. However, it is most desirable to keep rolls 13 and 14 as close to each other as possible.

In the illustrative embodiment rolls 13 and 14 have the same included angle. However, when the smaller end of roll 14 is less in diameter than the smaller end of roll 13, the included angle of roll 14 is less than that of roll 13.

The rolls 12 and 13 are mounted for rotation about their cylindrical and conical axes so that the angle between these axes is equal to the included angle of the roll 13. Thus rolls 12 and 13 have opposed tangential planes that intersect along a line which is normal to the axis of roll 12 and which is between conical roll 13 and the apex of the cone of which the conical roll 13 is a frustum. This tangential plane of roll 12 is about at the line where web W leaves roll 12 to move to roll 13.

The cylindrical roll 30 is spring biased against roll 12 so that it serves as a means to feed web W to an initial contact with roll 12 along a line of contact that is parallel to the axis of cylindrical roll 12. The roll 29 is spring biased against roll 14 so that it serves as a means to position part of web W partially around and in contact with roll 14 by cooperating with roll 13 which transfers web W to roll 14. Thus feed-in roll 30 and take-off roll 29 serve as tension rolls to keep web W under tension. These rolls maintain web W in contact with rolls 12, 13 and 14.

The rolls 12, 13 and 14 are located with respect to each other and rolls 30 and 29 are located with respect to rolls 12 and 14 so that each portion of web W moves in contact with rolls 12, 13 and 14 for a major portion of the revolution of the surfaces of these rolls. This contact with rolls 12, 13, and 14 is preferably equal to about ¾ of the revolutions of their surfaces.

The arms 29a and 30a are spring biased to urge rolls 29 and 30 against rolls 14 and 12. As an alternative construction the housings of the bearings that rotatably mount rolls 29 and 30 can be mounted on brackets with spring loading in a conventional manner to urge rolls 29 and 30 against rolls 14 and 12.

The rolls 12, 13 and 14 are driven for rotation at speeds to provide a surface speed of roll 13 at its smaller end that is about 7 percent greater than the surface speed of roll 12 and to provide a surface speed of roll 14 at its smaller end that is about 10 percent greater than the surface speed of roll 12. When the smaller ends of rolls 13 and 14 have the same diameter as roll 12, the foregoing condition of surface speeds is obtained by rotating roll 13 at a faster speed than roll 12 and by rotating roll 14 at a faster speed than roll 13. The differences in speed of rotation, i.e., revolutions per minute, of rolls 12, 13 and 14 is provided by using sprockets of different diameters as sprockets 15, 16 and 17. The web W stretches as it moves from roll 12 to roll 13. The amount of stretching is not uniform across the width of web W. There is more stretching of web W at the edge closer to the larger end of roll 13. Because web W is not in contact with any roll when passing from roll 12 to roll 13, the stretching of web W in one direction results in the contraction of its width so that the thickness of web W is substantially maintained.

The stretching of web W between rolls 12 and 13 creates stresses within the plastic material. These stresses are relieved by the heat treatment of web W while it is in contact with roll 13. The faster surface speed of roll 14 as compared with the surface speed of rolls 12 and 13 is used to prevent any contraction of web W before it has a chance to cool by moving partially around a roll 14.

The rolls 12 and 14 are rotated in the same direction, i.e., clockwise as viewed in FIG. 2. The roll 13 is rotated in the opposite direction, i.e., counterclockwise as viewed in FIG. 2.

The apparatus has been operated successfully using a web feeding rate of about 20 feet per minute. Of course, the rate of feeding of the web of material through the apparatus depends upon the capacity of heating rolls 12 and 13 and cooling roll 14 and upon the radius of curvature that is desired for the cut-off line. Basically the heating capacity for rolls 12 and 13 is a limting factor.

The hood 23 serves as a means to retard the cooling of web W as it is passing partially around rolls 12 and 13. In the absence of hood 23 or some other means to retard cooling of web W and of heated rolls 12 and 13 there is inadequate heating of web W. The hood 23 or other means to retard cooling is advantageous when radiant heaters or the like are used to heat web W as it passes partially around rolls 12 and 13. The web W with straight edges is fed to roll 12 through opening 28 in hood 23 and stretched web W having curved edges is withdrawn from the apparatus through opening 28a in hood 23 after passing between rolls 14 and 28.

The conical roll 29 in the illustrative embodiment has smaller ends than those of rolls 13 and 14. For this reason roll 29 has a smaller included angle. The smaller end of roll 29 is 4 inches in diameter and the included angle is about 1°58′ whereas the included angle of rolls 13 and 14 is about 10°30′.

The rolls 29 and 30 may be metal or wood rolls. If metal, they are coated as described above for rolls 12, 13 and 14. If they are made of wood, they are coated with the silicone resin and then merely air dried for 24 hours. The latter treatment is used for roll 56.

Assuming that web W has a 10-inch wide colored band which decreases in intensity of coloration from one edge of web W, the cut-off line between the colored and uncolored portions of the plastic is 10 inches from that edge of web W.

The shorter end of conical roll 13 in the illustrative embodiment is 11 feet from the apex of its conical surface. Thus web W is passed around rolls 12, 13 and 14 with colored band of web W closer to the shorter ends of rolls 13 and 14. To produce a radius of curvature of 12 feet for the cut-off line between the colored and the uncolored portion, the edge of web W beginning the colored band is positioned two inches from the smaller end of rolls 13 and 14.

By feeding web W around rolls 13 and 14 either closer or farther from the small ends of these rolls the radius of curvature will be other than the 12-foot radius mentioned above. However, there is a limit to these different radii of curvature of web W that are obtainable with use of specific rolls 13 and 14 in the apparatus of the present invention. To produce web W having a substantially different radius of curvature it is necessary to use rolls 13 and 14 which have a substantially different included angle than that mentioned above for the illustrated embodiment.

The desired radius of curvature of the cut-off line between the colored band and the uncolored portion of web W is determined by the distance of the smaller end of conical roll 13 from the apex of the cone of which roll 13 is a frustum. The latter distance to the apex is equal to the desired radius of curvature of the cut-off line minus the width of the colored band (assuming the band starts at one edge) and minus the distance between the smaller end of roll 13 and this colored edge of web W.

In the preferred embodiment pipes 77 in rolls 12, 13 and 14 are sufficiently short so that a reservoir of fluid is maintained in these rolls. Thus fluid is fed to these rolls by nozzles 97 until the fluid level reaches the bottom ends of pipe 77. Then fluid is piped from these rolls as it is being fed into these rolls. The fluid is circulated between one of tubes 12, 13 and 14 and one of heat exchangers 92 and 93 and refrigerator 96. Instead of this arrangement electrical heaters can be mounted internally in rolls 12 and 13 as a means of heating these rolls to impart heat to web W when it is in contact with these rolls.

The web W may be air cooled as it passes around roll 14, as will be apparent to one skilled in the art. However, it is preferred that the internal cooling of roll 14 be the means of cooling web W during its contact with roll 14.

Various modifications of the apparatus will be apparent to one skilled in the art from the description of the preferred embodiment as presented above and in the drawings. Thus the invention is not to be limited by this description but only by the claims that follow.

I claim:

1. An apparatus for continuously stretching a sheeting of a plastic material in web form having straight edges to produce a web having curved edges, which comprises a supporting structure, a cylindrical roll mounted on said supporting structure for rotation about its cylindrical axis, first and second conical rolls mounted on said supporting structure for rotation about their conical axes, with the smaller end of said first conical roll adjacent to the smaller end of said second conical roll, with the smaller end of said first conical roll adjacent to said cylindrical roll and with the larger end of said first conical roll spaced substantially farther away from said cylindrical roll, means to rotate said cylindrical roll and said first and second conical rolls, means to provide tension to the web when moving in a path of travel partially around said cylindrical roll and said first and second conical rolls, said cylindrical roll and said first and second conical rolls being positioned with respect to one another and with respect to said tensioning means to provide contact of the moving web with a major portion of the revolution of the surfaces of said three rolls during travel of the web in contact with said cylindrical roll, said first conical roll and said second conical roll in that order, means to heat the web during contact of the web with said cylindrical roll and with said first conical roll and means to cool the web during contact of the web with said second conical roll.

2. The apparatus of claim 1 including means to retard cooling of the web during contact of the web with said cylindrical roll and with said first conical roll.

3. The apparatus of claim 2 wherein said means to retard cooling of the web during contact with said cylindrical roll and said first conical roll includes a hood over said cylindrical roll and said first conical roll, said hood having an opening through which the web can move toward said cylindrical roll and an opening through which the web can move away from the said first conical roll.

4. The apparatus of claim 3 wherein said hood is over said second conical roll.

5. The apparatus of claim 4 wherein said rotating means for said rolls rotates said cylindrical roll and said second conical in the same direction and said first conical roll in an opposite direction.

6. The apparatus of claim 1 wherein the angle between the cylindrical axis of said cylindrical roll and the conical axis of said first conical roll equals the included angle of said first conical roll.

7. The apparatus of claim 6 including a hood over said cylindrical roll and said first and second conical rolls, said hood having an opening through which the web can move toward said cylindrical roll and an opening through which the web can move away from said second conical roll.

8. The apparatus of claim 7 wherein said rotating means for said rolls rotates said cylindrical roll and said second conical roll in the same direction and said first conical roll in an opposite direction.

9. The apparatus of claim 8 wherein said cylindrical roll and said conical roll have a coating of a silicone resin to minimize adhesion of the web to said rolls.

10. An apparatus for continuously stretching a sheeting of a plastic material in web form having straight edges to produce a web having curved edges, which comprises a supporting structure, a cylindrical roll mounted on said supporting structure for rotation about its cylindrical axis, first and second conical rolls mounted on said supporting structure for rotation about their conical axes, with the smaller end of said first conical roll adjacent to the smaller end of said second conical roll, with the smaller end of said first conical roll adjacent to said cylindrical roll and with the larger end of said first conical roll spaced substantially farther away from said cylindrical roll, said cylindrical axis of said cylindrical roll being at an angle relative to said conical axis of said first conical roll equal to the included angle of said first conical roll, means to rotate said cylindrical roll, means to rotate said first conical roll at a faster surface speed of its smaller end than the surface speed of said cylindrical roll provided by said rotating means for said cylindrical roll, means to rotate said second conical roll at a faster surface speed of its smaller end than the surface speed of the smaller end of said first conical roll provided by said rotating means for said first conical roll, means to provide tension to the web when moving in a path of travel partially around said cylindrical roll and said first and second conical rolls, said cylindrical roll and said first and second conical rolls being positioned with respect to one another and with respect to said tensioning means to provide contact of the moving web with a major portion of the revolution of the surfaces of said three rolls during travel of the web in contact with said cylindrical roll, said first conical roll and said second conical roll in that order, means to heat the web during contact of the web with said cylindrical roll and said first conical roll and means to cool the web during contact of the web with said second conical roll.

11. The apparatus of claim 10 including means to retard cooling of the web during contact of the web with said cylindrical roll and said first conical roll and wherein said rotating means for said cylindrical roll and said rotating means for said second conical roll rotate said rolls in the same direction and said rotating means for said first conical roll rotates said first conical roll in an opposite direction.

12. The apparatus of claim 11 wherein said retarding means includes a hood over said cylindrical roll and said first and second conical rolls, said hood having an opening through which the web can move toward said cylindrical roll and an opening through which the web can move away from said second conical roll.

13. The apparatus of claim 12 wherein said means to provide tension to the web includes a second cylindrical roll rotatably mounted on the supporting structure, means to urge said second cylindrical roll against said first mentioned cylindrical roll, a third conical roll rotatably mounted on the supporting structure and means to urge said third conical roll against said second conical roll with their smaller ends being adjacent.

14. The apparatus of claim 13 wherein said means to heat the web during contact with said cylindrical roll and said first conical roll includes means to heat internally said cylindrical roll and said first conical roll and wherein said means to cool the web during contact with said second conical roll includes means to cool internally said second conical roll.

15. The apparatus of claim 14 wherein said means to heat internally said first-mentioned cylindrical roll and said first conical roll includes first and second heat exchangers to heat fluid in said heat exchangers, means to circulate fluid between said first heat exchanger and the interior of said first-mentioned cylindrical roll and means to circulate fluid between said second heat exchanger and the interior of said first conical roll and wherein said means to cool internally said second conical roll includes a refrigerator to cool a fluid and means to circulate fluid between said refrigerator and said second conical roll.

16. The apparatus of claim 15 wherein each of said circulating means associated with one of said first-mentioned cylindrical roll and said first and second conical rolls includes an open-ended pipe extending downwardly within the associated roll with the open end of the pipe spaced above the bottom interior surface of the roll, whereby a fluid reservoir is maintained in the roll, a second pipe extending into the roll, spray nozzles mounted on said second pipe to spray fluid against the interior of the roll above the fluid reservoir, means to flow the fluid from said heat exchangers in the case of said first-mentioned cylindrical roll and said first conical roll to said second pipes associated with these rolls, means to return fluid through said open-ended pipes within said first-mentioned cylindrical roll and said first conical roll to said heat exchangers, means to flow the fluid from said refrigerator to said second pipe in said second conical roll and means to return fluid through said open-ended pipe within said second conical pipe to said refrigerator.

17. The apparatus of claim 16 wherein the smaller ends of said first and second conical rolls have diameters equal to the diameter of said first-mentioned cylindrical roll and wherein said rotating means for said first-mentioned cylindrical roll, said rotating means for said first conical roll and said rotating means for said second conical roll are constructed to rotate said first conical roll faster than said first-mentioned cylindrical roll but slower than said second conical roll.

18. The apparatus of claim 16 wherein said cylindrical rolls and said first, second and third conical rolls have a coating of a silicone resin to minimize adhesive of the web to said rolls.

References Cited in the file of this patent
UNITED STATES PATENTS

| | | |
|---|---|---|
| 2,501,584 | Schanz | Mar. 21, 1950 |
| 2,767,435 | Alles | Oct. 23, 1956 |

FOREIGN PATENTS

| | | |
|---|---|---|
| 162,242 | Germany | Apr. 9, 1904 |

OTHER REFERENCES

Ziegler: Plastics Mold Release, India Rubber World, pp. 826–829, September 1946.

UNITED STATES PATENT OFFICE
CERTIFICATE OF CORRECTION

Patent No. 3,019,475                        February 6, 1962

William G. Smith

It is hereby certified that error appears in the above numbered patent requiring correction and that the said Letters Patent should read as corrected below.

Column 3, line 34, for "shaft" read -- shafts --; column 7, line 30, for "limting" read -- limiting --; column 9, line 2, after "conical" insert -- roll --; column 10, line 56, for "adhesive" read -- adhesion --.

Signed and sealed this 30th day of October 1962.

(SEAL)
Attest:

ERNEST W. SWIDER
Attesting Officer

DAVID L. LADD
Commissioner of Patents